United States Patent
Wang et al.

(10) Patent No.: US 11,275,277 B2
(45) Date of Patent: Mar. 15, 2022

(54) COLOR FILTER SUBSTRATE, MANUFACTURING METHOD THEREOF AND DISPLAY PANEL

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Xiongwei Wang, Beijing (CN); Baojie Zhao, Beijing (CN); Jian Li, Beijing (CN); Li Wang, Beijing (CN); Xiang Hui, Beijing (CN); Yan Zhao, Beijing (CN); Qinglin Ma, Beijing (CN); Chunhong Ma, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 100 days.

(21) Appl. No.: 16/622,583

(22) PCT Filed: Mar. 18, 2019

(86) PCT No.: PCT/CN2019/078479
§ 371 (c)(1),
(2) Date: Dec. 13, 2019

(87) PCT Pub. No.: WO2019/184743
PCT Pub. Date: Oct. 3, 2019

(65) Prior Publication Data
US 2021/0149236 A1    May 20, 2021

(30) Foreign Application Priority Data
Mar. 30, 2018   (CN) .......................... 201810290657.4

(51) Int. Cl.
*G02F 1/1339* (2006.01)
*G02F 1/1335* (2006.01)
*G02F 1/1333* (2006.01)

(52) U.S. Cl.
CPC .... *G02F 1/13394* (2013.01); *G02F 1/133357* (2021.01); *G02F 1/133512* (2013.01); *G02F 1/133516* (2013.01)

(58) Field of Classification Search
CPC ........... G02F 1/13394; G02F 1/133512; G02F 1/133516; G02F 1/13398; G02F 1/136209; G02F 1/133514; G02F 1/136222
See application file for complete search history.

(56) References Cited

U.S. PATENT DOCUMENTS 9,880,427 B2   1/2018  Guo et al.
2016/0187701 A1   6/2016  Zheng
(Continued)

FOREIGN PATENT DOCUMENTS

CN   102231026 A   11/2011
CN   103257482 A   8/2013
(Continued)

OTHER PUBLICATIONS

English language translation of Chinese Patent Publication No. CN205405015 published on Jul. 27, 2016; document downloaded from the European Patent Office website at https://worldwide.espacenet.com/ on May 13, 2021; translation performed by Google Translate tool on-site. (Year: 2016).*
(Continued)

*Primary Examiner* — Angela K Davison
(74) *Attorney, Agent, or Firm* — Nath, Goldberg & Meyer; Joshua B. Goldberg

(57) ABSTRACT

The disclosure provides a color filter substrate, including a base substrate and a black matrix in multiple rows and multiple columns arranged on the base substrate; a color filter layer on the base substrate, including a plurality of color channels arranged at intervals and defined by the multiple columns of the black matrix, and each color channel including a plurality of color units defined by the multiple rows of the black matrix; and at least one spacer (Continued)

reference structure, each including at least two sub-structures respectively arranged in at least two adjacent color channels and on a same row of the black matrix, each sub-structure being arranged on a surface of the black matrix distal to the base substrate; a height difference between surfaces of the at least two sub-structures distal to the base substrate is less than a first threshold.

20 Claims, 3 Drawing Sheets

(56) References Cited

U.S. PATENT DOCUMENTS

| | | | |
|---|---|---|---|
| 2018/0031910 A1* | 2/2018 | Li | G02F 1/1335 |
| 2018/0180920 A1* | 6/2018 | Zhang | G02F 1/133516 |
| 2020/0310184 A1* | 10/2020 | Imai | G02F 1/133512 |

FOREIGN PATENT DOCUMENTS

| | | |
|---|---|---|
| CN | 103529591 A | 1/2014 |
| CN | 104090403 A | 10/2014 |
| CN | 106125391 A | 11/2016 |
| CN | 108508658 A | 9/2018 |
| JP | 2009-109842 A | 5/2009 |
| KR | 2000-0015175 A | 3/2000 |

OTHER PUBLICATIONS

Office Action dated Mar. 3, 2020 issued in corresponding Chinese Application No. 201810290657.4.

* cited by examiner

COLOR FILTER SUBSTRATE, MANUFACTURING METHOD THEREOF AND DISPLAY PANEL

CROSS-REFERENCE TO RELATED APPLICATIONS

This is a National Phase Application filed under 35 U.S.C. 371 as a national stage of PCT/CN2019/078479, filed on Mar. 18, 2019, which application claims the priority of Chinese Patent Application No. 201810290657.4 entitled "color filter substrate, manufacturing method thereof and display panel" filed on Mar. 30, 2018, and both applications are incorporated hereby in their entirety by reference.

TECHNICAL FIELD

The disclosure relates to the field of display technology, and in particular to a color filter substrate, a manufacturing method thereof and a display panel.

BACKGROUND

In the field of display technology, liquid crystal panels have occupied the market of display panels due to their advantages of low power consumption, lightness and thinness, portability, and the like. The liquid crystal panel includes a color filter substrate, an array substrate, and a liquid crystal layer located between the color filter substrate and the array substrate, and after the color filter substrate and the array substrate are aligned with each other and assembled together to form a cell, in order to maintain the cell gap therebetween, spacers are generally formed on the color filter substrate at present.

SUMMARY

The present disclosure provides a color filter substrate, a manufacturing method thereof and a display panel, aiming to solve the problem of a large height error when measuring the height of the spacers in the related art.

In a first aspect, the present disclosure provides a color filter substrate, including: a base substrate and a black matrix in multiple rows and multiple columns on the base substrate;

a color filter layer on the base substrate, the color filter layer including a plurality of color channels arranged at intervals and defined by the multiple columns of the black matrix, and each color channel including a plurality of color units defined by the multiple rows of the black matrix;

at least one spacer reference structure, each spacer reference structure including at least two sub-structures which are respectively arranged in at least two adjacent color channels and on a same row of the black matrix, and each sub-structure being on a surface of the black matrix distal to the base substrate; a height difference between surfaces of the at least two sub-structures distal to the base substrate is smaller than a first threshold;

wherein an orthographic projection of the spacer reference structure on the base substrate is within an orthographic projection of the black matrix on the base substrate, and is not overlapped with an orthographic projection of the color filter layer on the base substrate.

In an embodiment, the at least two sub-structures have a uniform height as a whole.

In an embodiment, the spacer reference structure is made of the same material and has the same height as one of the plurality of color units.

In an embodiment, a thickness of the color filter layer is greater than a thickness of the black matrix.

In an embodiment, the plurality of spacer reference structures are regularly arranged.

In an embodiment, the plurality of spacer reference structures are arranged in an array having a plurality of rows.

In an embodiment, the first threshold is zero.

In an embodiment, the color unit includes a first color unit, a second color unit, and a third color unit.

In an embodiment, the color filter substrate further includes a planarization layer on the color filter layer.

In a second aspect, the present disclosure provides a manufacturing method for a color filter substrate, including:

forming a black matrix in multiple rows and multiple columns on a base substrate;

forming a color filter layer on the base substrate, wherein the color filter layer includes a plurality of color channels arranged at intervals and defined by the multiple columns of the black matrix, and each color channel includes a plurality of color units defined by the multiple rows of black matrix;

forming at least one spacer reference structure while forming the color filter layer, wherein forming the spacer reference structure includes forming at least two sub-structures in at least two adjacent color channels and on a same row of the black matrix, and the sub-structures are arranged on a surface of the black matrix distal to the base substrate; a height difference between surfaces of the at least two sub-structures distal to the base substrate is smaller than a first threshold.

In an embodiment, the at least two sub-structures have a uniform height as a whole.

In an embodiment, the spacer reference structure is made of the same material and has the same height as one of the plurality of color units.

In an embodiment, a thickness of the color filter layer is greater than a thickness of the black matrix, the spacer reference structures are regularly arranged, and a height difference between upper surfaces of the spacer reference structures is zero.

In an embodiment, forming at least one spacer reference structure includes forming the spacer reference structure by adopting any patterning processes for forming at least one color unit.

In an embodiment, the color unit includes a first color unit, a second color unit, and a third color unit.

In a third aspect, the present disclosure provides a display panel, including a spacer, a mask and a color filter substrate, the spacer is arranged on a surface of at least one spacer reference structure of the color filter substrate; and the color filter substrate is the color filter substrate in any one embodiment of the first aspect.

By the above technical solution, the present disclosure provides a color filter substrate, a manufacturing method thereof and a display panel, the color filter substrate includes: a base substrate and a black matrix in multiple rows and multiple columns on the base substrate; a color filter layer on the base substrate and including a plurality of color channels arranged at intervals and defined by the multiple columns of the black matrix, each color channel including a plurality of color units defined by the multiple rows of the black matrix; at least one spacer reference structure on a surface of the black matrix distal to the base substrate; surfaces of all the spacer reference structures distal to the base substrate are horizontal planes, and spacers are to be arranged on the surfaces of the spacer reference structures; a height difference between the surfaces of all the spacer reference structures are smaller than a first threshold;

orthographic projections of all the spacer reference structures on the base substrate are within an orthographic projection of the black matrix on the base substrate and are not overlapped with an orthographic projection of the color filter layer on the base substrate. In the present disclosure, the height difference between the surfaces of all the spacer reference structures, which serve as datum planes for measuring the spacer, are smaller than a first threshold, and therefore, the measurement error can be greatly reduced by using the datum planes as a reference for measuring the height of the spacer.

The above description is only an overview of the technical solutions of the present disclosure, and in order to make the technical means of the present disclosure more clear, the present disclosure may be implemented in accordance with the content of the description, and in order to make the above and other objects, features, and advantages of the present disclosure more clear, the following description is given in conjunction with the specific embodiments of the present disclosure.

BRIEF DESCRIPTION OF THE DRAWINGS

From the following detailed description of the specific embodiments, other advantages and benefits of the present disclosure will be apparent to those skilled in the art. The drawings are only for purposes of illustrating the embodiments and are not to be construed as limiting the present disclosure. Besides, throughout the drawings, same reference numerals refer to the same parts. In the drawings.

DETAIL DESCRIPTION OF EMBODIMENTS

Figure 1:
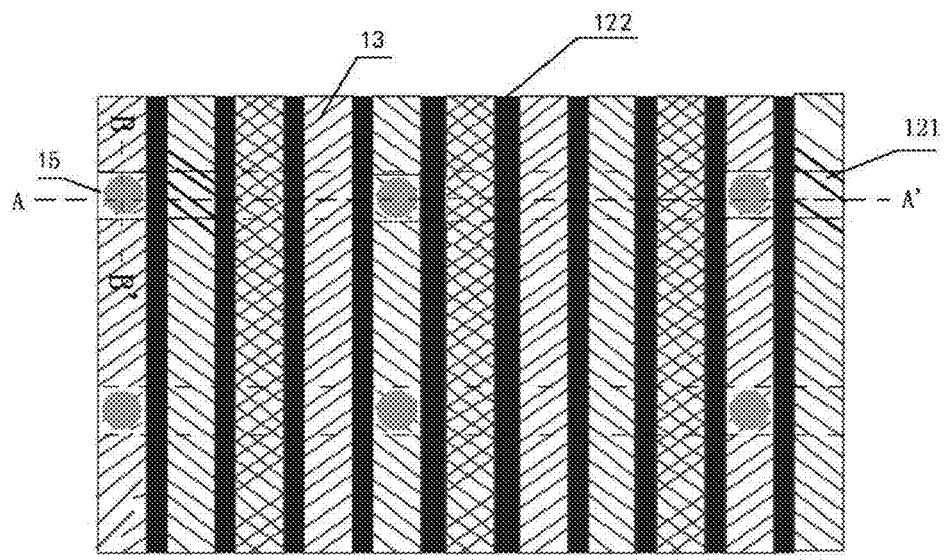
FIG. 1 is a plan view of a color filter substrate in the related art.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited to the embodiments set forth herein. Rather, these embodiments are provided so that the present disclosure will be completely understood, and will fully convey the scope of the disclosure to those skilled in the art.

The spacers are classified into main spacers and auxiliary spacers. The main spacers are usually compressed to some extent to maintain the cell gap and in a compression state, and the auxiliary spacers are usually not compressed. When the liquid crystal panel is subjected to an excessive external force, the auxiliary spacers are compressed to provide auxiliary supporting. At present, when the height of the spacer is measured, a datum plane is selected as a measurement reference object to realize the measurement of the spacer.

In implementing the above process, the inventor found that, when the spacers are irregularly arranged on the RGB sub-pixels in the related art, the same sub-pixel cannot be selected as a datum plane when measuring the height of the spacers, and because the film thicknesses of the RGB sub-pixels have a difference, which results in a height error in the height measurement of the spacers.

Figure 2A:
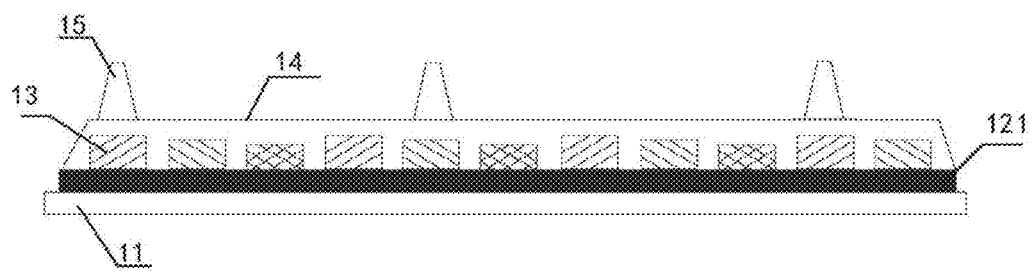
FIG. 2A is a cross-sectional view of the color filter substrate in the related art along line AA'.
Figure 2B:
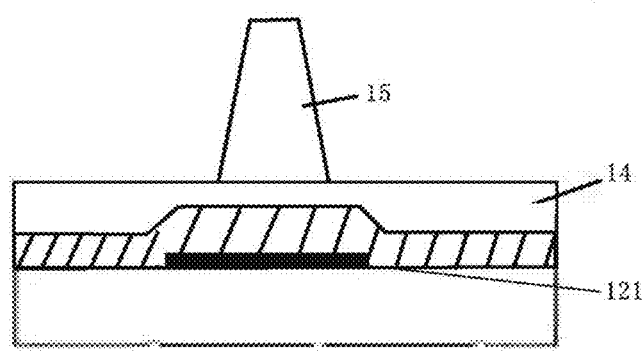
FIG. 2B is a cross-sectional view of the color filter substrate in the related art along line BB'.

FIGS. 1, 2A and 2B illustrate a color filter substrate (CF) in the related art. The color filter substrate includes a base substrate 11, a row black matrix 121, a column black matrix 122 and a color filter layer 13. A black matrix in multiple rows and multiple columns is arranged on the base substrate 11, and the color filter layer 13 is arranged on the base substrate 11. The color filter layer 13 includes a plurality of RGB color channels, each color channel includes a plurality of color units, and the plurality of color units are separated from each other by the black matrix. The color filter substrate further includes a planarization layer 14 located on the color filter layer 13.

FIG. 2A more clearly shows the relationship between the base substrate 11, the row black matrix 121, and the color filter layer 13. In practical applications, the color filter layer 13 may be continuously distributed in the hollow area surrounded by the row black matrix 121 and the column black matrix 122, or may be distributed in blocks in a discontinuous manner, which is not limited specifically.

FIG. 2B is a cross-sectional view of the color filter substrate of FIG. 1 along line BB' of FIG. 1. The row black matrix 121 in each color channel is covered by the pigment filled in the color channel during the process of forming the color filter layer. The spacers are randomly arranged on the row black matrix of one or more color channels.

In practical applications, in addition to the color filter substrate shown in FIG. 1, the display panel further includes a spacer 15 arranged on the color filter layer 13 and on a side of the color filter layer 13 distal to the black matrix 12, and the spacer 15 is actually located right above the planarization layer 14 and on a side of the planarization layer 14 distal to the black matrix 12. In FIG. 1, the color filter layer 13 is formed in an RGB sequence, and in practical applications, a BGR sequence or the like may also be used, and the process for sequencing the colors in the color filter layer 13 is not limited.

Generally, a Thin Film Transistor-Liquid Crystal Display (TFT-LCD) is formed by filling liquid crystal between an array substrate and a color filter substrate and assembling the array substrate and the color filter substrate together to form a cell. In order to keep the thickness uniformity of the cell and the stability of the panel, a certain number of spacers 15 are arranged between the array substrate and the color filter substrate for supporting, and the spacers 15 may support and buffer the above two substrates, so that the liquid crystal is kept in a relatively stable state to ensure the display effect. Therefore, accurately measuring the actual height of the spacer 15 is the key to stabilize the liquid crystal.

In the related art, the spacers may be arranged randomly or according to some arrangement rule (e.g., in an array), and when the height of the spacers is measured, one nearby sub-pixel region in the color filter layer is selected as a datum plane, and the height of spacers is measured based on the datum plane. However, red, green, and blue pigments are filled in the R, G, and B color channels of the color filter layer respectively, and since the film thickness of each color is different, the height of the datum plane may be different when selecting the datum plane, which results in an error when measuring the height of the spacer.

Figure 3:
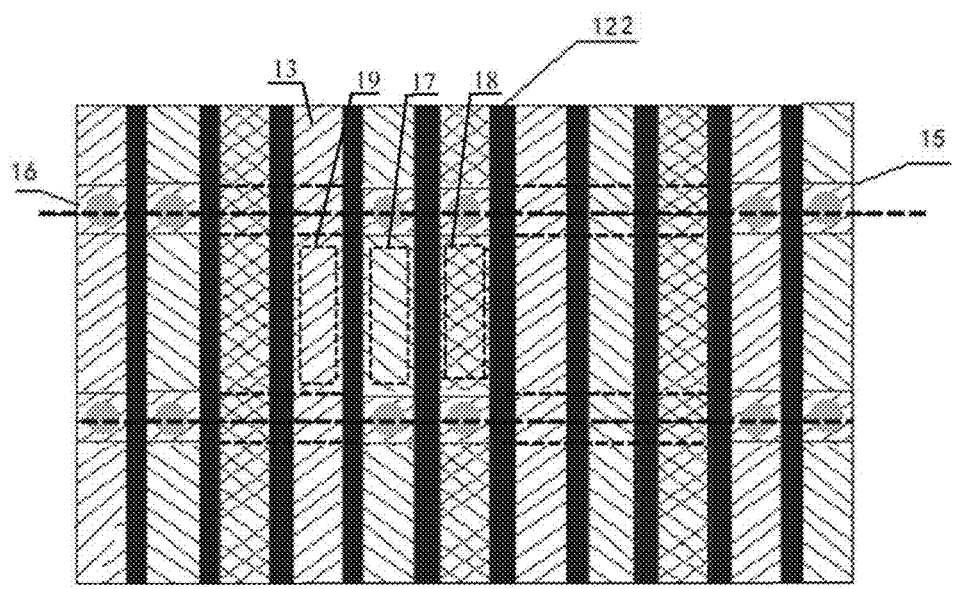
FIG. 3 is a schematic diagram of a color filter substrate according to an embodiment of the present disclosure.

In order to solve the problems in the related art, in the embodiments of the present disclosure, when selecting the datum plane, the datum plane having the same height or the datum plane as a whole having substantially the same height will be selected. As shown in FIG. 3, all spacer reference structures 16 form a horizontal plane as the datum plane. The position of the spacer 15 may be determined first, and accordingly the position of the spacer reference structure can be determined. Alternatively, firstly, the position of the spacer reference structure is determined, and then the spacer is arranged on the spacer reference structure. The pigment of the same color is filled on the black matrix with the spacer reference structure, and serves as a reference for measuring the height of the spacer 15.

Since a color filter substrate usually includes N spacers 15 (N is greater than 2), in order to facilitate the measurement of the height of the spacers 15, the color filter layer 13 usually includes at least N spacer reference structures 16, or a plurality of spacers 15 may be arranged on one spacer reference structure 16, or one spacer 15 may be arranged on a plurality of spacer reference structures 16, as long as the spacer is arranged on the spacer reference structure. The position of the spacer reference structure may be predetermined. A spacer reference structure may also be arranged at the corresponding position of the color filter substrate where the spacer is placed. The spacer reference structures 16 form a plane; according to the embodiment of the present disclosure, the spacer reference structure 16 is arranged on the surface of the black matrix 12 distal to the base substrate 11; the surface of the spacer reference structure 16 distal to the base substrate 11 is a horizontal plane, and the surface of the spacer reference structure 16 is used for arranging a spacer 15; the height differences among the surfaces of all the spacer reference structures 16 are less than a first threshold, which may be determined according to product requirements or infinitely small. An orthographic projection of the spacer reference structure 16 on the base substrate 11 is located within an orthographic projection of the black matrix 12 on the base substrate 11, and is not overlapped with an orthographic projection of the color filter layer 13 on the base substrate 11. In this way, a planar surface of the spacer reference structure 16 can be selected as a datum plane used as a reference for the height of the spacer. In specific implementation, the size of the datum plane is selected to be smaller than or equal to the size of the spacer reference structure 16, so that the accuracy of the reference plane can be ensured.

In a particular embodiment, the height differences among the surfaces of all the spacer reference structures 16 are zero.

In the embodiment of the present disclosure, in order to improve the accuracy of the spacer measurement reference, the height differences among the surfaces of the spacer reference structures 16 must be smaller than the first threshold, and the first threshold takes account of slight errors occurring in the manufacturing process. In another implementation process of the embodiment of the present disclosure, in order to ensure the accuracy of measuring the height of the spacer, the smaller the value of the first threshold, the higher the accuracy of measuring the height of the spacer 15, for example, the first threshold may be set to be infinitely small and approach 0, or the first threshold may be set to be several nanometers, and the like, which is not limited in the embodiment of the present disclosure.

The spacer reference structures 16 form a plane to ensure that all datum planes in the color filter substrate have the same height when selecting the datum plane.

Figure 4:
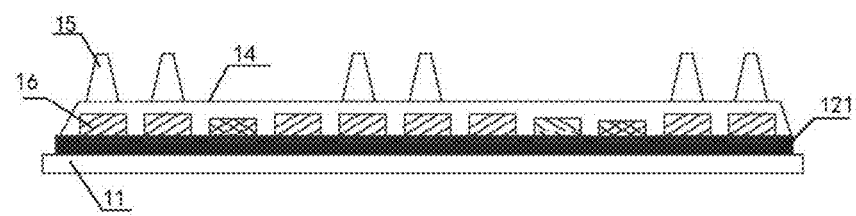
FIG. 4 is a cross-sectional view of a color filter substrate according to an embodiment of the present disclosure along the dashed line shown in FIG. 3.

FIG. 4 is a cross-sectional view of a color filter substrate according to an embodiment of the disclosure, along a cross-sectional line (shown by a dotted line, not labeled in the figure) in FIG. 3. As can be seen from FIG. 4, in the embodiment, the two spacer reference structures 16 corresponding to and located right below the spacer 15 may be made of a material of the same color as any one color of the color filter layer, so that the spacer reference structures 16 can be formed at the same time when the pixel unit of the one color of the color filter layer is formed. In addition, as can be directly seen from FIG. 4, the thickness of the color filter layer 13 is greater than the thickness of the black matrix 12.

In practical applications, the spacer reference structure 16 is actually located above the black matrix 12, and a planarization layer 14 is located above the color filter layer 13.

The color filter substrate provided by the embodiment of the present disclosure includes: a base substrate; a black matrix in multiple rows and multiple columns arranged on the base substrate; a color filter layer arranged on the base substrate and including a plurality of color channels arranged at intervals and defined by the multiple columns of the black matrix, each color channel including a plurality of color units defined by the multiple rows of the black matrix; and at least one spacer reference structure, each including at least two sub-structures which are respectively arranged in at least two adjacent color channels and on the same row of the black matrix, each sub-structure being arranged on the surface of the black matrix distal to the base substrate; surfaces of all the spacer reference structures distal to the base substrate are horizontal planes; height differences among the surfaces of all the spacer reference structures are smaller than a first threshold, which can be determined according to product requirements or infinitely small; the orthographic projection of the at least one spacer reference structure on the base substrate is located within the orthographic projection of the black matrix on the base substrate and is not overlapped with the orthographic projection of the color filter layer on the base substrate; in the embodiment of the disclosure, the height differences among the surfaces of all the spacer reference structures are smaller than the first threshold, and the surface of at least one spacer reference structure is used as a datum plane for measuring the spacer, so that the measurement error can be greatly reduced by using the datum plane as a reference for measuring the height of the spacer.

Further, as a refinement and extension of the above embodiment, the spacer reference structure 16 is above the row black matrix 121, and the size, such as the width, of the spacer reference structure 16 is equal to the size (such as the width) of one sub-pixel on the color channel of the color filter layer 13 adjacent thereto.

It should be noted that, in order to ensure that the spacer reference structure 16 has a uniform height, and when filling the hollow structure with a predetermined color, the material and the manufacturing process of the spacer reference structure are the same as those of the color units of the color filter layer having the same color as the spacer reference structure, so as to ensure consistency.

The spacer 15 has a supporting function, and the arrangement of the spacer reference structure can improve the uniformity of the overall thickness of the liquid crystal display apparatus. In practical applications, the spacers 15 include main spacers 15 and auxiliary spacers 15. The height of the main spacer 15 is greater than the height of the auxiliary spacer 15, and the spacers 15 can be randomly or regularly arranged on the black matrix, and the spacer 15 is located on one side of a portion between any two sub-pixels of the first color unit 17 (Red color), the second color unit 18 (Green color) and the third color unit 19 (Blue color) of the color filter layer. In practical applications, the first color unit 17 may also be Green or Blue, or the like, and is not limited specifically, but for convenience of description, the embodiment of the disclosure describes that a plurality of first color units 17 are combined to form a Red color channel, a plurality of second color units 18 are combined to form a Green color channel, and a plurality of third color units 19 are combined to form a Blue color channel. However, it should be noted that this description is not intended to define a binding relationship between color units and color channels.

Figure 5:
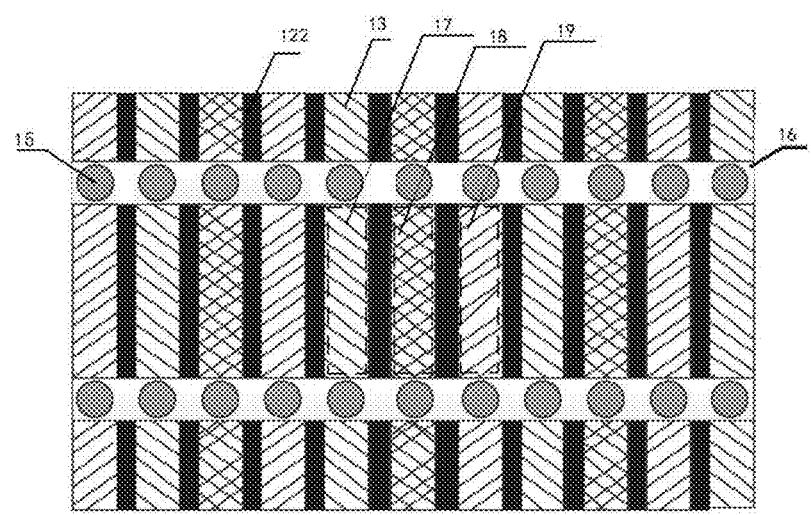
FIG. 5 is a schematic diagram of a color filter substrate according to another embodiment of the present disclosure.

For example, as shown in FIG. 5, it is assumed that the spacers 15 in the color filter substrate are arranged on the same horizontal line, one spacer 15 is arranged between two color units, and a straight line formed by connecting the main spacers 15 is vertical to each color channel. If the spacers 15 are arranged as above (as shown in FIG. 5), the spacer reference structure 16 shown in FIG. 5 may be arranged on the color filter layer 13, where the spacer reference structure 16 extends in a line vertical to each color channel in the color filter layer 13. By this design, even if the spacer 15 moves slightly, it is not required to reposition the spacer reference structure 16. In other words, it is not required to reselect the datum plane.

In the description of FIG. 5, the orthographic projection of the spacer 15 on the base substrate 11 is located within the orthographic projection of the spacer reference structure on the base substrate 11. As another implementation of the embodiment of the present disclosure, the spacer 15 may be located only between two adjacent color channels, or two spacers 15 are located among three adjacent color channels, which also satisfy the application scenario that the orthographic projection of the spacer 15 on the base substrate 11 is located within the orthographic projection of the spacer reference structure on the base substrate 11.

FIG. 5 is intended to illustrate the spacers 15 and the spacer reference structures 16 are continuously arranged, and in the following embodiment, an application scenario in which the spacers 15 and the spacer reference structures 16 are discontinuously arranged will be described. As can be seen from FIG. 5, the color filter layer 13 includes color units (including first color units 17, second color units 18, and third color units 19) defined by the black matrix 12 and arranged in an array, and the spacer reference structures 16 may be arranged between adjacent rows of the first color units 17, the second color units 18, or the third color units 19, and may be regularly arranged. For example, one spacer 15 and the spacer reference structure 16 are arranged every two color units, or one spacer 15 and the spacer reference structure 16 are arranged every three color units.

As an implementation of the embodiment of the present disclosure, the spacer reference structures 16 may also be arranged in an array. Referring to FIG. 5, the spacer reference structures 16 are arranged in two rows, and in practical applications, the spacer reference structures may be arranged as needed, and on the premise that normal display of the display panel is not affected, more rows, such as four rows, three rows or the like, of spacer reference structures 16 may be arranged, so that selection of the datum plane will be more flexible. The embodiments of the present disclosure are not limited thereto.

The spacer reference structure 16 in the above embodiments may be arranged at a position of the color filter substrate corresponding to the black matrix region, that is, an orthogonal projection of the spacer reference structure 16 on the base substrate 11 is located within an orthogonal projection of the black matrix 12 on the base substrate 11, and is not overlapped with an orthogonal projection of the color filter layer 13 on the base substrate 11. In the embodiment of the present disclosure, the spacer reference structure is aligned with the adjacent color unit in the column direction, i.e. the spacer reference structure 16 has the same width as the adjacent color unit.

Figure 6:
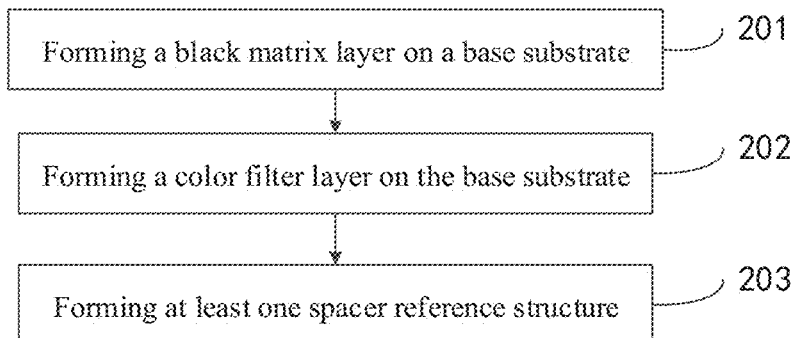
FIG. 6 is a flowchart of a manufacturing method for a color filter substrate according to another embodiment of the present disclosure.

The embodiment of the present disclosure further provides a manufacturing method for a color filter substrate, which is applied to a process of manufacturing the color filter substrate shown in any one of FIGS. 1 to 5. As shown in FIG. 6, the method includes steps 201 to 203.

In step 201, a black matrix layer is formed on a base substrate.

In step 202, a color filter layer is formed on the base substrate.

The color filter layer includes at least three color channels, and in the specific implementation process, red, green and blue pigments are respectively filled in a Red color channel, a Green color channel and a Blue color channel, and each color channel consists of a plurality of color units (or sub-pixels) and the color units are used for filtering light rays with different colors.

In step 203, at least one spacer reference structure is formed.

All the spacer reference structures are arranged on the surface of the black matrix distal to the base substrate; the surfaces of all the spacer reference structures are distal to the base substrate are horizontal planes; the height differences among the surfaces of all the spacer reference structures are smaller than a first threshold.

In the embodiment of the present disclosure, the height differences among the surfaces of the spacer reference structures must be smaller than the first threshold, which may be determined according to product requirements or infinitely small, thereby enhancing the accuracy of the height measurement. The first threshold takes account of slight errors occurring during the manufacturing process. In another implementation process of the embodiment of the present disclosure, in order to ensure that the height of the spacer reference structure is uniform, the smaller the value of the first threshold is, the higher the measurement accuracy of the height of the spacer is, for example, the first threshold may be set to be infinitesimal and approach 0, or the first threshold may be set to be 0.1 nm or the like, which is not limited in the embodiment of the disclosure.

In the manufacturing method for a color filter substrate provided by the embodiment of the present disclosure, the color filter substrate includes: a base substrate, a black matrix arranged on the base substrate; a color filter layer which is arranged on the base substrate; and at least one spacer reference structure, which is arranged on the surface of the black matrix distal to the base substrate; the surfaces of all the spacer reference structures distal to the base substrate are horizontal planes; the height difference between the surfaces of all the spacer reference structures is smaller than a first threshold, and the first threshold can be determined according to product requirements or infinitely small; the orthographic projection of the spacer reference structure on the base substrate is arranged within the orthographic projection of the black matrix on the base substrate and is not overlapped with the orthographic projection of the color filter layer on the base substrate; in the embodiment of the disclosure, the height differences between the surfaces of all the spacer reference structures are smaller than the first threshold, and the surfaces of the spacer reference structures are used as datum planes for measuring the spacers, so that the measurement error can be greatly reduced by using the datum planes as a reference for measuring the heights of the spacers.

The purpose of the embodiments of the present disclosure is to ensure that the height differences between the spacer reference structures are minimized, so that the accuracy of the height of the spacer can be increased when measuring the height of the spacer in a subsequent process, and the following optional methods can be adopted in the manufacturing process of the color filter substrate in the embodiments of the present disclosure, for example: the expected position of the spacer is determined and the sub-pixel closest to the expected position of the spacer is selected. In practical applications, determining the expected position of the spacer may include but is not limited to the following two modes. In the first mode, the expected position of the spacer is determined according to the coordinates in the color filter substrate, and the upper left corner of the color filter substrate is the origin of coordinates. In the second mode, the expected position of the spacer is determined according to the relative position between the expected position of the spacer and the color filter layer, and each color channel in the color filter layer has a unique identifier. In the embodiments of the present disclosure, the determination of the expected position of the spacer is not limited.

After it is determined to select the sub-pixel closest to the expected position of the spacer, a spacer reference structure may be formed in the corresponding region of the sub-pixel to improve the speed and accuracy of the height measurement of the spacer.

In the embodiment of the present disclosure, the first color units, the second color units and the third color units are formed in an array in the color filter layer, and are defined by the black matrix, and the color units form different color channels in the color filter layer. The spacer reference structure is arranged between two adjacent rows of the first color units, the second color units or the third color units.

When a plurality of spacer reference structures are formed in step 203, the step may include, but is not limited to, forming the spacer reference structures by using a patterning process for forming any one of the first color unit, the second color unit, and the third color unit to ensure consistency, that is, the spacer reference structure is formed in the same patterning process as one of the first color unit, the second color unit, and the third color unit, and the patterning process in the embodiment of the present disclosure at least includes using the same mask to perform exposure, development, and the like. Further, the spacer reference structure is made of the same material as one of the first color unit, the second color unit and the third color unit, so that the process is simplified.

Further, an embodiment of the present disclosure provides a display panel, including a spacer and a color filter substrate; and the color filter substrate is the color filter substrate shown in any one of FIGS. 1 to 5.

The spacer is located in the area where the black matrix is located so as not to affect normal display.

In the foregoing embodiments, the descriptions of the respective embodiments have respective emphasis, and for parts that are not described in detail in a certain embodiment, reference may be made to related descriptions of other embodiments.

It will be appreciated that the relevant features of the method and apparatus described above are referred to one another. In addition, "first", "second", and the like in the above embodiments are for distinguishing the embodiments, and do not represent merits of the embodiments.

It is clear to those skilled in the art that, for convenience and brevity of description, the specific working processes of the above-described systems, apparatuses and units may refer to the corresponding processes in the foregoing method embodiments, and are not described herein again.

In the description provided herein, numerous specific details are set forth. However, it is understood that embodiments of the disclosure may be practiced without these specific details. In some instances, well-known methods, structures and techniques are not shown in detail in order not to obscure an understanding of this description.

Similarly, it should be appreciated that in the foregoing description of exemplary embodiments of the disclosure, various features of the disclosure are sometimes grouped together in a single embodiment, figure, or description thereof for the purpose of streamlining the disclosure and facilitating the understanding of one or more of the various inventive aspects. However, the disclosed method should not be interpreted as reflecting an intention that the claimed disclosure requires more features than are expressly recited in each claim. Thus, the claims following the detailed description are hereby expressly incorporated into this detailed description, with each claim standing on its own as a separate embodiment of this disclosure.

Those skilled in the art will appreciate that the modules in the device in an embodiment may be adaptively changed and disposed in one or more devices different from the embodiment. The modules or units or components in the embodiments may be combined into one module or unit or component, or they may be divided into a plurality of sub-modules or sub-units or sub-components. All of the features disclosed in this specification (including the accompanying claims, abstract and drawings), and all of the processes or elements of any method or apparatus so disclosed, may be combined in any combination, except combinations where at least some of such features and/or processes or elements are mutually exclusive. Each feature disclosed in this specification (including the accompanying claims, abstract and drawings) may be replaced by alternative features serving the same, equivalent or similar purpose, unless expressly stated otherwise.

Moreover, those of skill in the art will appreciate that while some embodiments described herein include certain features included in other embodiments, combinations of features of different embodiments are meant to be within the scope of the disclosure and form different embodiments. For example, in the following claims, any of the claimed embodiments may be used in any combination.

Those skilled in the art will appreciate that a microprocessor or Digital Signal Processor (DSP) may be used in practice to implement some or all of the functions of some or all of the components of the color filter substrate, the method of measuring the spacer height in the color filter substrate, and the display substrate according to the embodiments of the present disclosure. The present disclosure may also be embodied as apparatus or device programs (e.g., computer programs and computer program products) for performing part or all of the methods described herein.

It should be noted that the above-mentioned embodiments illustrate rather than limit the disclosure, and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim. The word "a" or "an" preceding an element does not exclude the presence of a plurality of such elements. The disclosure may be implemented by means of hardware comprising several distinct elements, and by means of a suitably programmed computer. In the unit claims enumerating several means, several of these means may be embodied by the same item of hardware. The usage of the words first, second and third, etcetera do not indicate any ordering. These words may be interpreted as names.

What is claimed is:

1. A color filter substrate, comprising:
   a base substrate;
   a black matrix in multiple rows and multiple columns on the base substrate;
   a color filter layer on the base substrate, the color filter layer comprising a plurality of color channels arranged at intervals and defined by the multiple columns of the black matrix, and each color channel comprising a plurality of color filters defined by the multiple rows of the black matrix;
   at least one spacer reference structure, each spacer reference structure comprising at least two sub-structures respectively arranged in at least two adjacent color channels and on a same row of the black matrix, and each sub-structure of the at least two sub-structures being on a surface of the black matrix distal to the base substrate; a height difference between surfaces of the at least two sub-structures distal to the base substrate is smaller than a first threshold;
   wherein an orthographic projection of the spacer reference structure on the base substrate is within an orthographic projection of the black matrix on the base substrate, and is not overlapped with an orthographic projection of the color filter layer on the base substrate;
   the plurality of color filters comprise color filters of at least two different colors with different thicknesses; and
   the at least two sub-structures are made of a same material and have a same thickness as one color filter of the color filters of the at least two different colors, which has a largest height relative to the base substrate.

2. The color filter substrate according to claim 1, wherein the at least two sub-structures each as a whole have a same height relative to the base substrate.

3. The color filter substrate according to claim 1, wherein the first threshold is substantially zero.

4. The color filter substrate according to claim 1, wherein the plurality of color filters comprise a first color filter, a second color filter and a third color filter.

5. The color filter substrate according to claim 1, further comprising a planarization layer on a side of the color filter layer distal to the base substrate.

6. The color filter substrate according to claim 1, wherein an orthographic projection of each of the at least two sub-structures on the base substrate is overlapped with an orthographic projection of an overlapping part between the row of the black matrix and the color channel, where the sub-structure is located, on the base substrate.

7. A display panel, comprising at least one spacer and a color filter substrate, wherein the color filter substrate is the color filter substrate of claim 1, and the at least one spacer is arranged on a surface of at least one spacer reference structure of the color filter substrate.

8. The display panel according to claim 7, wherein the at least two sub-structures each as a whole have a uniform height relative to the base substrate, and the at least two sub-structures are made of a same material and have a same thickness as one color filter of the plurality of color filters.

9. The display panel according to claim 8, further comprising a planarization layer on a side of the color filter layer distal to the base substrate, wherein the at least one spacer is arranged on the planarization layer.

10. The display panel according to claim 8, wherein the at least one spacer reference structure comprises a plurality of spacer reference structures, and the plurality of spacer reference structures are regularly arranged in a plurality of rows;
    the spacer reference structures in a same row are continuously arranged; and
    the at least one spacer comprises a plurality of spacers respectively arranged on the sub-structures of the spacer reference structures in the same row.

11. The color filter substrate according to claim 1, wherein the thickness of the color filter is greater than a thickness of the black matrix.

12. The color filter substrate according to claim 11, wherein the at least one spacer reference structure comprises a plurality of spacer reference structures, and the plurality of spacer reference structures are regularly arranged.

13. The color filter substrate of claim 12, wherein the plurality of spacer reference structures are arranged in a plurality of rows.

14. The color filter substrate of claim 13, where the spacer reference structures in a same row are continuously arranged.

15. A manufacturing method for a color filter substrate, comprising:
    forming a black matrix in multiple rows and multiple columns on a base substrate;
    forming a color filter layer on the base substrate, the color filter layer comprising a plurality of color channels arranged at intervals and defined by the multiple columns of the black matrix, and each color channel comprising a plurality of color filters defined by the multiple rows of the black matrix, which comprise color filters of at least two different colors with different thicknesses; and
    forming at least one spacer reference structure while forming the color filter layer, wherein forming the spacer reference structure comprises forming at least two sub-structures in at least two adjacent color channels and on a same row of the black matrix, and the at least two sub-structures are arranged on a surface of the black matrix distal to the base substrate; a height difference between surfaces of the at least two sub-structures distal to the base substrate is smaller than a first threshold; and the at least two sub-structures are made of a same material and have a same thickness as one color filter of the color filters of the at least two different colors, which has a largest height relative to the base substrate.

16. The method according to claim 15, wherein the plurality of color filters comprise a color filter of a first color, a color filter of a second color, and a color filter of a third color.

17. The method according to claim 15, wherein an orthographic projection of each of the at least two sub-structures on the base substrate is overlapped with an orthographic projection of an overlapping part between the row of the black matrix and the color channel, where the sub-structure is located, on the base substrate.

18. The method according to claim 15, wherein the at least two sub-structures each as a whole have a same height relative to the base substrate.

19. The method according to claim 18, wherein a thickness of the color filter layer is greater than a thickness of the black matrix, the color filter substrate comprises a plurality of spacer reference structures, the plurality of spacer reference structures are regularly arranged, and a height difference between upper surfaces of the plurality of spacer reference structures is zero.

20. The method according to claim 19, wherein forming at least one spacer reference structure comprises:

forming the at least one spacer reference structure by a same patterning process as for forming the one color filter.

* * * * *